United States Patent

Kobori

[15] 3,645,556
[45] Feb. 29, 1972

[54] SAFETY NET PILLOW FOR VEHICLE PASSENGERS

[72] Inventor: Yasusaburo Kobori, Tokyo, Japan
[73] Assignee: Kabushikikaisha G.I.C., Tokyo, Japan
[22] Filed: Dec. 12, 1969
[21] Appl. No.: 884,477

[30] Foreign Application Priority Data

Dec. 18, 1968  Japan..............................43/109928
May 15, 1969  Japan..............................44/46072

[52] U.S. Cl. ........................................................280/150 B
[51] Int. Cl. .........................................................B60r 21/02
[58] Field of Search ....................280/150 B; 296/84 K, 397; 297/399, 400

[56] References Cited

UNITED STATES PATENTS

| | | | |
|---|---|---|---|
| 485,374 | 11/1892 | Durkee | 297/399 |
| 2,056,479 | 10/1936 | Newman | 297/400 |
| 2,897,878 | 8/1959 | Mungovan | 297/399 |
| 3,062,586 | 11/1962 | Rowland | 297/399 |
| 3,172,702 | 3/1965 | Rose | 280/150 B |

Primary Examiner—Kenneth H. Betts
Assistant Examiner—Robert R. Song
Attorney—Hill, Sherman, Meroni, Gross & Simpson

[57] ABSTRACT

A safety net pillow for the prevention of the snapping back of the head of a vehicle passenger having a net stretched on a frame, and leg means attached to the lower portion of the frame for detachably mounting the frame on the back of a seat of the vehicle in such a manner that the net stretched on the frame stands substantially upright.

2 Claims, 8 Drawing Figures

Patented Feb. 29, 1972 3,645,556
2 Sheets-Sheet 1
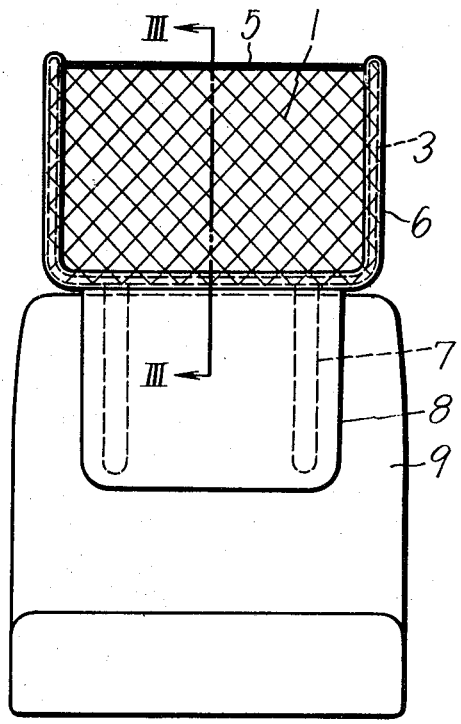
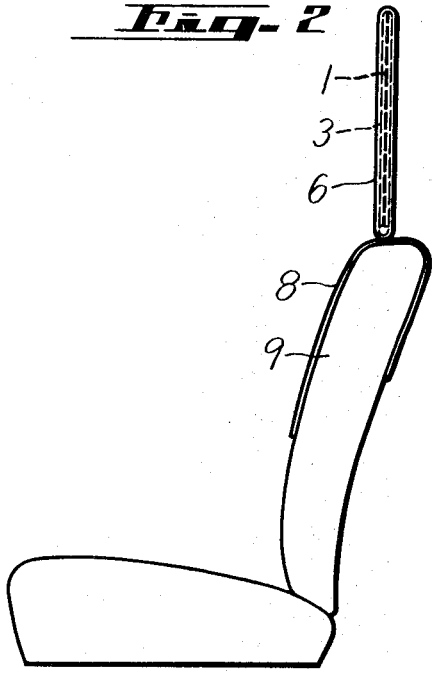
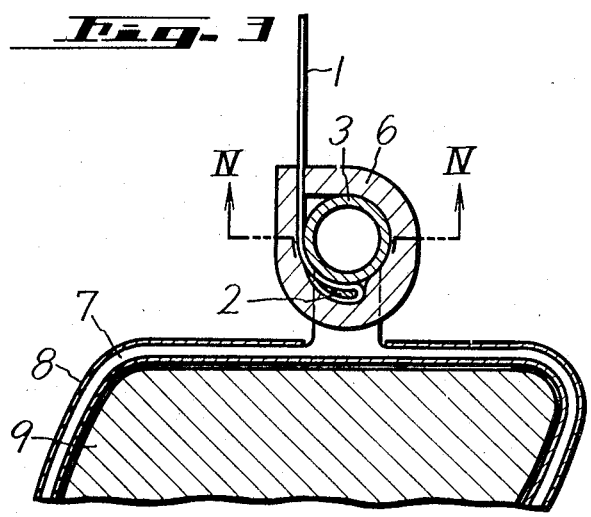
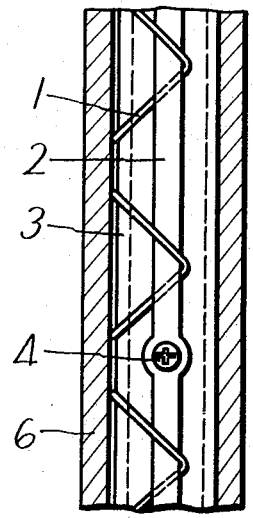
INVENTOR
Yasusaburo Kobori
BY ATTYS.

Patented Feb. 29, 1972 3,645,556
2 Sheets-Sheet 2
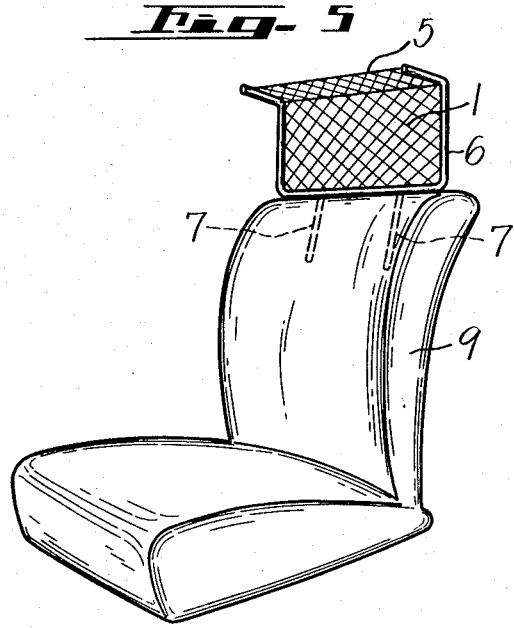
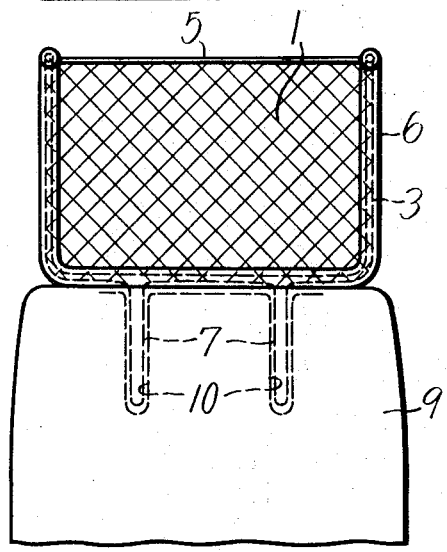
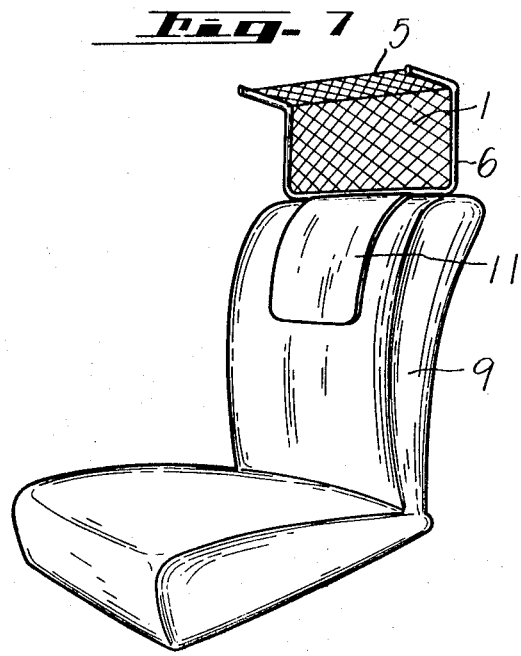
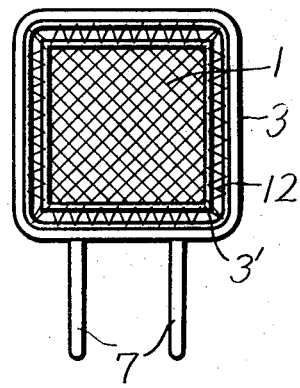
INVENTOR
Yasusaburo Kobori
BY Hill, Sherman, Meroni, Gross & Simpson ATTYS.

SAFETY NET PILLOW FOR VEHICLE PASSENGERS

BACKGROUND OF THE INVENTION

1. Field of the Invention

This invention relates to a safety net pillow for the prevention of the so-called "whiplash" injuries to a vehicle passenger which are caused by the sudden snapping back of his head due to a violent instantaneous impact when involved in an accident, especially in a rear end collision and the present invention has more particular reference to a safety net of this kind which can be detachably mounted on the seat in automobiles.

2. Description of the Prior Art

There has heretofore been proposed a headrest which is commonly referred to as an auto pillow for preventing the head of a vehicle passenger from snapping back in an accident. Although this auto pillow (Pillow for Preventing Rearward Inclination of Vehicle Passenger's Head, JIS-D4605-1968) conforms to the safety standard of the Japan Industrial Standard prescribing than the angle of the snapping back of the vehicle passenger's head is 45° at maximum in a rear end collision of a vehicle travelling at a speed of 32 km./hr., the auto pillow is inevitably attended by the following fatal disadvantage. That is, the safety standard states that the auto pillow is made of a foam material and is preferred to be located at a distance of less than 10 cm. from the passenger's head and this is for fear of a rebound action of the auto pillow immediately following the initial impact of the passenger's head on the auto pillow in the event of an accident. Further, it might be said that in a rear end collision of a vehicle travelling at a speed exceeding the aforementioned one such rebound of the auto pillow frequently results in serious whiplash injury to the neck.

This is proved by the research on the actual condition of rear end collisions conducted by the Traffic Division of the Shizuoka Prefectural Police Headquarters of Japan (2,063 rear end crashes in 3 months from April to June of 1968). According to this research, the rear end collision at a speed of about 30 km./hr. is less than 15 percent of the whole and that at a speed of 40 to 50 km./hr. amounts to 75 percent. Further, this research points out a noteworthy fact that the rate of occurrence of the whiplash injury in automobiles with the auto pillow installed therein is higher than in automobiles with no auto pillow.

SUMMARY OF THE INVENTION

Accordingly, the primary object of this invention is to provide a safety net for the prevention of the snapping back of the vehicle passenger's head which is free from the aforementioned defect experienced in the conventional safety device such as the auto pillow.

The net employed in the present invention has the properties of absorbing an impact applied thereto at one location and dispersing it substantially over the entire area thereof by chain reaction due to its construction, as will be described later in connection with embodiments of this invention (impact tests conducted at the Higashimurayama Detached Office of the Machinery Experiment Laboratory of the Industrial Technology Agency of the Ministry of International Trade and Industry of Japan).

Recently, most of the seats of automobiles are designed to be freely inclined backwardly for comfort. Accordingly, the safety net is required to be of such a construction as to allow ease in installation and removal without hindering the inclining operation of the seat.

BRIEF DESCRIPTION OF THE DRAWINGS

FIG. 1 is a front view of a safety net of this invention fixedly mounted on the top of the back of a seat of a car;

FIG. 2 is its side view;

FIG. 3 is a fragmentary cross-sectional view taken along the line III—III in FIG. 1;

FIG. 4 is a fragmentary cross-sectional view taken along the line IV—IV in FIG. 3;

FIG. 5 is a perspective view of a modified form of the safety net of this invention mounted on the top of the back of the seat;

FIG. 6 is a front view of the safety net depicted in FIG. 5;

FIG. 7 is a perspective view of another modified form of the safety net of this invention mounted on the top of the back of the seat; and FIG. 8 is a schematic diagram of the principal part of still another modification of this invention.

DESCRIPTION OF THE PREFERRED EMBODIMENTS

For a better understanding of this invention a description will be given first of the general function of the safety net which is employed in this invention.

The safety net completely absorbs the pact of the passenger's head thrown against it without producing any rebound action even when the net is spaced a distance of about 50cm apart from the head. This has been ascertained by experiments using catapults (conducted by the Biodynamics Section (Impact Test) of Aeromedical Laboratory of Japan Self Defense Air Forces in March of 1968) and by experiments using automobiles (conducted at the Higashimurayama Detached Office of the Machinery Experiment Laboratory of the Industrial Technology Agency of the Ministry of International Trade and Industry of Japan in September of 1967).

In these experiments, when an automobile not equipped with the safety net was crashed from the rear at a speed of 37.6 km./hr., the head of a dummy in the automobile was subjected to an inertial force having a horizontal component of 7.3G maximum in a forward direction and 21.3G at maximum in a rearward direction and vertical components of 26.6G maximum in an upward direction and 6.8G maximum in a downward direction. Further, it has been found that the backward inclination angle of the dummy's head was 73° at maximum force.

While, in the case of a rear end collision of an automobile equipped with the safety net, the dummy's head in the automobile crashed from the rear was subjected to an inertial force having horizontal components of 2.6G maximum in the forward direction and 10.2G maximum in the rearward direction and vertical components of 2.8G maximum in the upward direction and 2.8G maximum in the downward direction. The inclination angle of the dummy's head in the forward direction was 45° maximum.

A comparison of the results of the experiments shows that the inertial force G exerted on the dummy's head in the rear end crash of the automobile equipped with the safety net is about one-third and one-half in the forward and rearward directions of the horizontal components and approximately one-tenth and two-fifths in the upward and downward directions of the vertical components of those of the inertial force G obtained with the automobile having no safety net. This considerable reduction of the inertial forces indicates that the cords forming the safety net weakened and absorbed the inertial force of the dummy's head thrown against the net in the rear end collision and that the impact force applied to the net was transmitted sequentially to the net through the cords forming meshes of the net by chain reaction of the tension and was thereby absorbed and damped. Further, in the automobile not having a safety net of the present invention, the dummy's head was snapped back through an angle of 73°. This greatly exceeds a mean value 61° of the physiological limit of the inclination angle of a man's head and consequently in such a rear end collision an occupant of the automobile hit would seldom survive and, if he did survive, he would receive a serious "whiplash" injury.

On the contrary, in the case of the rear end collision of the automobile having the safety net of the present invention, the dummy's head was snapped forward by an angle of only 45° from its normal position which is appreciably smaller than the aforementioned physiological critical value 61°. Accordingly, the safety net would protect the life of the occupant of the automobile in the event of an accident.

Referring now to FIGS. 1 to 4, a description will be made in connection with one example of a mounting means of the safety net of this invention.

A net 1 woven with cords or strands of, for example, nylon yarn is formed about a support plate 2 at its right, left and lower margins (refer to FIGS. 2 and 3) and the support plate 2 is secured by means of threaded rods 4 to the outside of a substantially U-shaped frame 3 as of a pipe in such a manner that the net 1 be stretched at a suitable tension. The upper margin of the net 1 is similarly formed about a strip 5 as of nylon and the strip 5 is secured to the U-shaped frame 3 at its right and left upper ends as shown. Further, the frame 3 is covered with an elastic damper material 6 such as, for example, rubber or the like and legs (mounting members) 7, by means of which the safety net 1 is fixedly mounted on the top of the back 9 of the seat, are firmly secured to the lower margin of the frame 3 at suitable spaced positions. A cover 8, constructed of a fabric, vinyl-leather cloth or the like, is attached to the front portion of the legs 7 and the legs 7 are snapped onto the back 9 of the seat to firmly hold it thereon, so that the safety net does not readily slip off from the back 9 of the seat when subjected to vibration and an impact and the net can be mounted on the top of the back 9 of the seat in a detachable manner.

In the event that a motor car equipped with the safety net of the above construction and arrangement is involved in a rear end crash, an occupant of the car, especially his head, is thrown back due to its inertia but is received by the safety net 1 stretched behind the head, thereby preventing the head from snapping back excessively. At the same time, the impact force of the head thrown against the safety net 1 is absorbed and damped by the net due to the extension of the cords as of nylon at that area where the head has directly struck and the impact of the head is rapidly transmitted all over the entire area of the net through the cords forming meshes of the net, thus ensuring that rebound action of the head does not occur. In this manner, the occupant of the car can be protected from the so-called "whiplash" injury with the safety net having the above three operational effects.

Further, since the safety net of this invention is simple in construction and relatively small, it does not occupy much space in the compartment of the car nor spoil its appearance. In addition, the safety net does not obstruct the rearward view of the occupant of the car while travelling since it is transparent. It is also easy to install and remove from the compartment and, further, its use is not limited to any particular types of automobiles. Moreover, the safety net is easy to manufacture, inexpensive and suited for mass production.

Referring to FIGS. 5 and 6, another example of this invention will hereinafter be described. In the figures, similar elements to those in FIGS. 1 to 4 are marked with the same reference numerals and are constructed and arranged similar to those in FIGS. 1-4 and no detailed description will be repeated.

The main difference between the safety nets shown in FIGS. 5 and 6 and that shown in FIG. 1-4 lies in the shape of the frame 3. Frame 3 of FIGS. 5 and 6 is substantially U-shaped in front elevation, and is in an inverted L-shape in side elevation. Otherwise its construction and arrangement are substantially the same as that of FIGS. 1-4. The frame 3 with the net 1 stretched between its arms in a taut condition as above described is mounted on the back 9 of the seat in the following manner. A pair of legs 7 are secured to the base portion of the frame 3 at positions corresponding to openings 10 formed in the back 9 of the seat for the attachment of, for example, a pillow thereto and the legs 7 are inserted into the holes 10.

In the event that a motor car equipped with the safety net of the above construction and arrangement is hit from behind, an occupant of the car, especially his head is thrown back by its inertia but is received by the safety net 1 stretched behind the head, thereby to prevent the head from snapping back excessively. At the same time, the impact force of the head thrown against the safety net 1 is absorbed and damped by the net due to the extension of the cords as of nylon at that area where the head has directly struck and the impact of the head is rapidly transmitted all over the entire area of the net through the cords forming meshes of the net, to completely avoid a rebound action of the head, thus ensuring that a repulsive force of the net is not applied to the head. In the rear end collision the safety net prevents the excessive snapping back of the head of the occupant of the car, absorbs and alleviates the impact of the head thrown back against the net and completely prevents the head from snapping forward due to a rebound action on the part of the net itself. With the safety net having these three functions, the occupant of the car is protected from the so-called "whiplash" injury.

Further, in the example of FIGS. 5 and 6 the opposed top end portions of the frame 3 are bent in the form of an inverted L and extend above the head of the occupant of the car and the net 1 is stretched between the bent portions, as shown in FIG. 5, in such a manner as to prevent a violent upward movement of the passenger's head due to the impact of the collision and hence to prevent the head from crashing against the ceiling of the compartment.

FIG. 7 shows another example of this invention, in which mounting means 11 are secured to the lower portion of the frame 3, instead of the legs 7 used in the examples of FIGS. 5 and 6, and these mounting means 11 can be snapped on the back of the seat 9 to mount the safety net 1 in position. In this case, too, the safety net 1 exhibits substantially the same effects as those obtainable with the above-described safety net.

FIG. 8 illustrates the principal part of another modified form of this invention. In the present example the frame 3 is circular in cross section and is formed to be substantially square, and the net 1 is stretched on an inner frame 3' in a taut condition which is smaller than the frame 3. A cord 12 as of nylon is entwined with the inner frame 3' and with the frame 3 thereby to firmly support the inner frame 3' inside of the frame 3. The inner frame 3' may be formed of a metal covered with a damper material or may be formed of woven or knit fabrics as of nylon. The frame 3 supporting the inner frame 3' with the net can be mounted on the back of the seat in exactly the same manner as in the foregoing examples. The safety net of FIG. 8 can be made in an attractive style and hence is very suitable for installation in the compartment of the vehicle.

Further, the net 1 is stretched on the inner frame 3' and, in turn, the inner frame 3' is assembled by the cord 12 with the frame 3 having mounting means 7, so that the inner frame 3' can be disassembled from the frame 3 with ease. This facilitates the replacement of the net 1 with a new one when fatigued or worn and enables freedom in the selection of the strength, color and the like of the net 1.

It will be apparent that many modifications and variations may be effected without departing from the scope of the novel concepts of this invention.

I claim as my invention:

1. A safety net for preventing the head of a passenger in a vehicle from snapping back comprising:
    a closed end frame;
    an inner frame secured to the closed end frame by a cord;
    a net stretched on the inner frame; and
    leg means attached to the lower portion of the closed end frame for detachably mounting the frame on the back of a seat of the vehicle in such a manner that the frame with the net stretched thereon stands substantially upright.

2. A safety device as claimed in claim 7 wherein said net is formed of nylon yarn.

* * * * *